UNITED STATES PATENT OFFICE.

LEO H. BAEKELAND, OF YONKERS, NEW YORK, ASSIGNOR TO GENERAL BAKELITE COMPANY, OF NEW YORK, N. Y., A CORPORATION OF NEW YORK.

MATRIX.

1,233,298.      Specification of Letters Patent.      Patented July 17, 1917.

Application filed March 26, 1912. Serial No. 686,408.

*To all whom it may concern:*

Be it known that I, LEO H. BAEKELAND, a citizen of the United States, residing at Yonkers, in the county of Westchester and State of New York, have invented certain new and useful Improvements in Matrices, of which the following is a specification.

This invention relates to improvements in the art of printing, and to matrices for use in connection therewith. According to the invention, a suitable material, usually fibrous, and usually in the form of a sheet or fabric, is impregnated with such phenolic condensation products as may be transformed or converted into an infusible substance, and the resulting preparation is molded into the form of a matrix, the condensation product with which it is impregnated being transformed, either during or after such molding into the hard and infusible state.

The matrix thus prepared is capable of withstanding the action of molten type metal or similar alloy during the period necessary for its solidification, without undergoing material distortion or flexion, and without gassing or sticking. It is capable therefore of affording exact and clear impressions.

The particular variety of infusible condensation product above described is insoluble in all ordinary solvents and is found to be sufficiently resistant to heat to render it adapted for use for the preparation of matrices which are capable of receiving molten alloys for the production of stereotype plates. The invention will be described by reference to certain preferred embodiments thereof, it being understood that it is not limited to the precise procedures or manipulations described.

The following is an illustrative example of the invention:—

To 1000 grams of phenol are added 40 grams of caustic soda dissolved in 100 grams of water, and 900 grams of 40 per cent. commercial formaldehyde, and the mixture is boiled in a suitable vessel, preferably provided with a return condenser, for about one hour, then quickly cooled. The liquid thus obtained may be suitably diluted by the addition of water or other solvent, either before or after the boiling process.

The proportion of caustic soda or of other ingredients may be varied, or other condensing agents, such as ammonia or other bases, acids or salts may be used, or the initial condensation product may be prepared in any other suitable way.

With the liquid thus obtained ordinary blotting paper is impregnated, and thereafter dried, the temperature being raised somewhat toward the end of the drying, but not sufficiently to destroy the plasticity of the sheet. If necessary, the impregnated sheet is flattened in a calender or flattening press and in this condition constitutes the matrix blank or mat.

The invention is especially important for the printing of newspapers, where a printing block of type metal must be cast or molded rapidly and inexpensively from the original type composition. In this case, the prepared or impregnated sheet constituting the mat or blank is first pressed, in a hot press, against the type, cut, or engraving to be reproduced, and thus a negative matrix thereof is obtained; from this matrix, a positive reproduction or stereotype is molded or cast, from which the final printing is performed in the usual way. In this case, the matrix or negative is simply used to cast one or more positive reproductions in type metal or other suitable material. This casting or molding is performed in accordance with the methods well known in the art.

The method as above described possesses very important advantages over those heretofore known, involving the use of ordinary paper matrices: first, the matrix gives a closer, better and more accurate reproduction; second, the matrix may be made so rigid as not to require any great amount of "bolstering" or "padding" on the back, for the purpose of reinforcing the blank spaces. This is highly important, not only by reason of the saving of labor, but because the loss of time required for this tedious operation is largely or entirely avoided, and the time which elapses between the moment the type leaves the typesetter's hand and the moment when the edition is ready for the press, is correspondingly abbreviated. This time element is of the utmost importance in newspaper printing.

One of the most advantageous methods of preparing such matrices is as follows:

The sheet of paper is prepared, or impregnated and dried, as described above, and is forced in the hot press against the type, cut, etching or engraving. The time varies according to conditions, and depends especially on the temperatures employed. Under good conditions and using a temperature of about 180° C., the time required has been reduced in practice to about 60 seconds, although under less favorable conditions several minutes may be required. It is merely necessary to heat in the press long enough to secure the degree of hardness requisite at this stage of the process, which degree may be less than the maximum hardness of which the composition is capable.

The sheet may now be further heated by means of a so-called "scorcher" which by the further application of heat brings the hardness to a maximum, completes the transformation of the condensation product into an infusible body, and at the same time expels any gaseous or volatile substances which might interfere with the further operation of casting the molten metal. For ordinary press work, a flat "scorcher" may be used, that is to say a hot plate, heated by any suitable means, and upon which the matrix is placed for a short time, or until a condition of hardness sufficiently approximating the maximum is attained.

In case a curved matrix is desired, as for rotary press work, it should of course be adapted in curvature to the requirements of the casting machine and press used. While the necessary curvature may be imparted at any stage of the process before the condition of ultimate hardness is reached, it has proven satisfactory in practice to curve the matrix during the "scorching" process above referred to. This is readily accomplished by providing a properly curved scorcher in which the matrices are simultaneously curved and heated. Such scorcher may be heated by gas flames, or electrically or otherwise, as may be preferred.

It has been found that if the paper used for impregnation is of too loose a texture, it may occur that in the act of casting in the auto-press, the molten type metal may be forced into the texture of the paper, thus spoiling the matrix as well as the cast stereotype. In order to avoid this, it is advantageous to provide the surface of the sheet of impregnated paper with a thin sheet of paper which is less pervious and of finer texture, as for instance tissue paper or the so-called "onion-skin" paper. Or instead of using ordinary paper of uniform texture, a special paper may be prepared, whereof the body is more porous than the surface, the latter being preferably somewhat similar to the so-called onion-skin paper or fine tissue paper, and presenting the desired close and compact texture. The use of starch or similar materials has also proven advantageous in insuring better adherence and a closer texture of the surface.

The invention is not limited to the use of an impregnating solution prepared as above described, inasmuch as condensation products capable of transformation into infusible products may be otherwise prepared, as for example according to the methods described in my prior U. S. Patents 942,809 and 942,699, or by other methods; or, obviously, the infusible condensation product may be indirectly prepared in accordance with such methods as are disclosed in my U. S. Patent No. 1,038,475.

Instead of paper as the material to be impregnated, satisfactory results have been obtained with woven fabrics, and even with wood. Paper is however usually preferred, as being more readily available and well suited for almost all practical cases.

Instead of starting with sheets of paper or of fibrous material, the initial condensation product may be simply mixed or compounded with fibrous materials, as for example pulp or wood fiber, and this composition can be molded into sheets or blocks or into forms of any character whatsoever from which the printing may be done directly, or which may be used as matrices for the molding of metallic stereotypes, precisely as described above with reference to the impregnated or coated paper.

If the paper or plastic mass is properly prepared and properly dried, no trouble will be experienced from sticking; but it has been observed that sticking can be prevented by the use of proper materials, as for instance talcum, stearin, graphite, and similar bodies. Such bodies may be introduced into the mass of the paper by any known means or simply distributed on the surface thereof.

In the above specification, as well as in the following claims, the word "phenols" is meant to designate not only the first member of the phenol group, but its homologues and isomers, or phenolic bodies, or mixtures thereof, which are equivalent in this reaction. And in the same way the polymers of formaldehyde, or other substances which may engender formaldehyde, may be used as equivalents of formaldehyde.

I claim:

1. A matrix for stereotype or like plates comprising a supporting sheet of fibrous material having incorporated therewith an infusible phenolic condensation product, said matrix capable of withstanding the action of molten type metal or similar alloy for the period necessary for its solidification, without material distortion, flexing, gassing or sticking, and capable of affording clear impressions thereof.

2. A mat or blank for stereotype or like matrices comprising a supporting sheet of fibrous material having incorporated therewith a phenolic condensation product which is capable of being transformed or converted into an infusible substance, said mat or blank adapted to receive readily an impression from the type, but transformable by heat into a matrix which is capable of withstanding the action of molten type metal or similar alloy for the period necessary for its solidification, without material distortion, flexing, gassing or sticking, and is capable of affording clear impressions thereof.

In testimony whereof I affix my signature in presence of two witnesses.

LEO H. BAEKELAND.

Witnesses:
A. R. BRENNECKE,
Jos. C. FULLER.